United States Patent [19]

Haganuma et al.

[11] Patent Number: 4,688,100

[45] Date of Patent: Aug. 18, 1987

[54] VIDEO DATA ENCODING/DECODING APPARATUS

[75] Inventors: Tomoyuki Haganuma, Yokohama; Yoji Kaneko, Machida, both of Japan

[73] Assignee: Canon Kabushiki Kaisha, Tokyo, Japan

[21] Appl. No.: 783,010

[22] Filed: Oct. 2, 1985

[30] Foreign Application Priority Data

Oct. 8, 1984 [JP] Japan ................ 59-210694
Oct. 8, 1984 [JP] Japan ................ 59-210695

[51] Int. Cl.⁴ .......................................... H04N 1/415
[52] U.S. Cl. .................................. 358/261; 358/260; 358/288
[58] Field of Search ................ 358/261, 260, 288

[56] References Cited

U.S. PATENT DOCUMENTS 2,909,601 10/1959 Fleckenstein ............ 358/261
3,394,352 7/1968 Wernikoff ............... 358/261
3,483,317 12/1969 De Groat ................ 358/261
4,366,505 12/1982 Tsuda et al. ............ 358/260
4,543,611 9/1985 Kurahayashi ........... 358/260

Primary Examiner—Howard W. Britton
Attorney, Agent, or Firm—Fitzpatrick, Cella, Harper & Scinto

[57] ABSTRACT

An encoding apparatus of the invention includes a multiplexer for converting serial input video data into 8-bit parallel video data, a counter for counting a run length of the serial input video data so as to generate its count as 6-bit parallel data, a detection circuit for detecting a variability point of the input video data, a mode control circuit for selecting the parallel output from the multiplexer or the counter in accordance with the content of the input video data, and a shift register for storing the parallel output selected by the mode control circuit. Meanwhile, a decoding apparatus of the invention includes a mode determination circuit for determining the content of the code data representing the video data or run length data, and counters for counting code data representing the video data or the run length data, respectively. The code data includes mode data representing the content thereof, and the mode determination circuit determines the content of the code data in accordance with the mode data.

14 Claims, 7 Drawing Figures

VIDEO DATA ENCODING/DECODING APPARATUS

BACKGROUND OF THE INVENTION

1. Field of the Invention

The present invention relates to an encoder for encoding video data in a facsimile system or an image file and, more particularly, to an encoding apparatus for encoding video data input from a scanner or the like and to a decoding apparatus for decoding the video data encoded by the encoding apparatus.

2. Description of the Prior Art

As an encoding method of video data, an MH code, an MR code, an MMR code and the like according to CCITT recommendations are used for a facsimile system. In this case, a public telephone network is employed as a transmission line, and a maximum transmission rate is about 9,600 bps. Therefore, conversion of video data into the above-mentioned codes or vice versa can be performed by software processing. In recent years, a digital line network is becoming popular in various countries, and a transmission rate thereof is, e.g., 48 kbps, 64 kbps or the like, which is greatly higher than that of a conventional facsimile system using a public telephone network. When original data is simply encoded as in a conventional manner, processing can no longer be performed by software and requires large scale hardware.

With the conventional encoding method, encoded data may become larger in data amount than the original data depending upon the content of the original video data. In this case, the output rate of the video data from a scanner exceeds the encoding speed, and the reading operation of the scanner is intermittently performed. That is, the reading operation must be temporarily stopped so as to be restarted after completion of previous encoding.

Similarly, a fetching operation for fetching encoded data into a decoding circuit cannot follow a printer output, and the printer must be intermittently operated.

SUMMARY OF THE INVENTION

The present invention has been made in consideration of the above situation, and has as its object to provide an encoding/decoding apparatus which can be suitably adapted to encode video data with a high data compression ratio.

It is another object of the present invention to provide a video data encoding apparatus which can perform high-speed encoding operation.

It is still another object of the present invention to provide a video data decoding apparatus which can cope with high-speed data transmission.

It is still another object of the present invention to provide a video data decoding apparatus which can continuously supply decoded video data to output equipment such as a printer.

It is still another object of the present invention to provide an encoding apparatus which can be suitably adapted to form an intermediate code for an encoding operation inside a system, i.e., to form an intermediate code used when video data is converted into a code according to CCITT recommendations such as an MH code, an MR code, an MMR code and the like.

According to the present invention, these objects are attained by providing an encoding apparatus having first and second generating means, the first of which outputs code data representing image color and the number of sequential or continuous input binary signals having that color, if it is discriminated that more than the predetermined number of sequential input signals represent the same color, or if it is detected that no variation point in color occurs within a predetermined number of consecutive input signals. The second generation means outputs the input signals themselves as code data, and operates in that fashion if such a discrimination or detection, as the case may be, fails to occur.

The above and other objects and features of the invention will be more fully appreciated from the following description taken in conjunction with the accompanying drawings.

DETAILED DESCRIPTION OF THE PREFERRED EMBODIMENT

The present invention will be described with reference to the accompanying drawings.

Figure 1A:
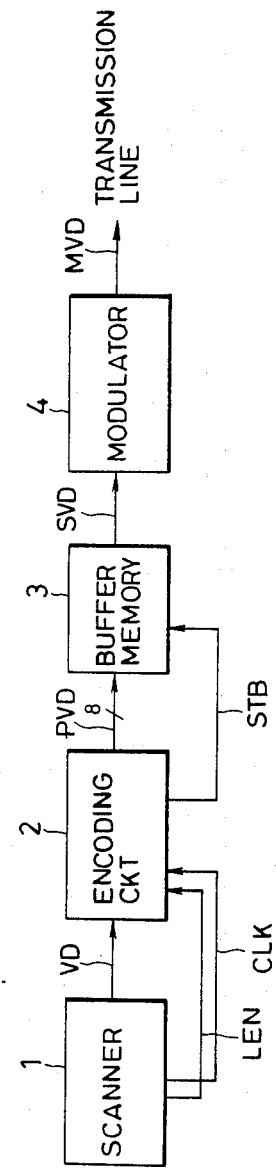
FIGS. 1A and 1B are block diagrams showing the arrangement of a facsimile system to which the present invention is applied.
Figure 1B:
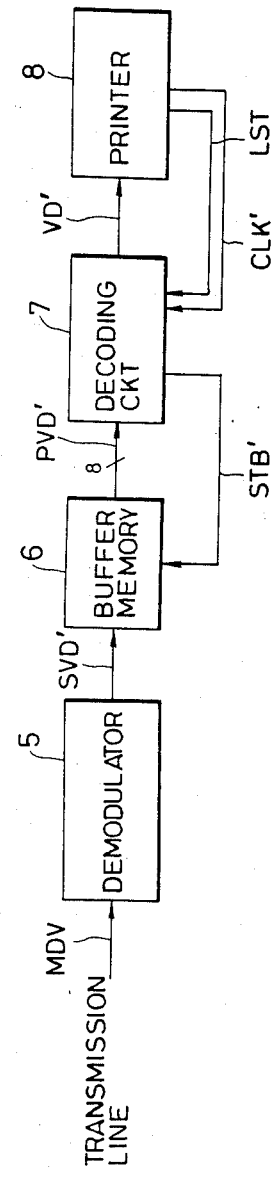

FIG. 1 shows the arrangement of a facsimile system wherein FIG. 1A shows a video data transmission apparatus, and FIG. 1B shows a video data reception apparatus.

Referring to FIG. 1A, a scanner 1 scans an original image to be transmitted by an imaging element such as a CCD, and continuously outputs serial binary video data VD indicating black/white content of each pixel of the original image for each line until the video data for one page is generated. An encoding circuit 2 fetches the video data VD from the scanner 1 and encodes the data VD into 8-bit parallel code data PVD for improving transmission efficiency (not that 8-bit data is suitable for data processing). The encoding circuit 2 receives from the scanner 1 a clock signal CLK synchronous with the video data and a line enable signal LEN as a mask signal indicating an output interval for one-line video data. A buffer memory 3 temporarily stores the parallel code data PVD supplied from the encoding circuit 2 in accordance with a data strobe signal STB, and generates the storage data as serial code data SVD at a proper timing. A modulator 4 modulates the serial code data SVD supplied from the buffer memory 3 into modulated data MVD suited to be transmitted on a transmission line. The modulated data MVD from the modulator 4 is transmitted to a reception apparatus through the transmission line.

Referring to FIG. 1B, a demodulator 5 demodulates the modulated data MVD received from the transmission apparatus through the transmission line into serial code data SVD'. A buffer memory 6 temporarily stores the serial code data SVD' from the demodulator 5 and generates it as 8-bit parallel code data PVD'. A decoding circuit 7 fetches the parallel code data PVD' from the buffer memory 6 and decodes it into binary video data VD' indicating black/white. The buffer memory 6 generates the code data PVD' in accordance with a strobe signal STB' from the decoding circuit 7. A printer 8 successively records a one-page image in units of lines on a recording medium in accordance with the binary video data VD' from the decoding circuit 7. The decoding circuit 7 receives from the printer 8 a clock signal CLK' synchronous with the video data VD' and a line start signal LST indicating a recording start timing for each line.

In this manner, the video data obtained by reading the original image is encoded by the transmission apparatus, and is transmitted through the transmission line. Then, the encoded data is received and decoded by the reception apparatus, and the image recording operation is performed in accordance with the decoded data. When the transmission and reception apparatuses are installed to be not too distant from each other and there is no possibility of an error occurring in the transmission of the data, the modulator in the transmission apparatus and the demodulator in the reception apparatus can be omitted.

In the embodiment of FIGS. 1A and 1B, since the encoding circuit 2 basically performs the encoding operation by using a run length code, the video data can be further converted into a well known code such as an MH code, an MR code, an MMR code or the like according to CCITT recommendations by using the code data generated from the encoding circuit 2 as an intermediate code. In this case, extra encoding and decoding circuits each consisting of a ROM storing a conversion table or the like are provided at the transmission and reception sides between the buffer memories and the modulator and demodulator.

At the transmission side, the code data PVD from the encoding circuit 2 is used as an intermediate code for further encoding, e.g., MH encoding of the video data. On the other hand, at the reception side, the code data is further decoded by using the decoded MH code as an intermediate code, thereby obtaining the desired video data VD'. According to this method, conversion to a compression encoding method of CCITT recommendation can be performed at higher speed than in the case wherein encoding is performed directly from original data, resulting in an improved transmission efficiency.

The encoding operation of the encoding circuit 2 shown in FIG. 1A will now be described. Table 1 is a code table of the 8-bit parallel code data PVD generated from the encoding circuit 2. The upper 2 bits ($b_7$, $b_6$) of the code data PVD represent mode data indicating characteristics of the data.

The encoding circuit 2 samples the video data VD supplied from the scanner 1 by means of a 6-bit (6-pixel) window so as to check it. If at least one variability point, where there is a transition from black to white or vice versa, is detected in 6 bits, the compression operation for redundancy suppression is not executed with respect to the 6-bit data, and the corresponding data is encoded as non-compressed data. This encoding operation is called a video mode. The data encoded in the video mode can be identified by setting the mode data, i.e., the upper 2 bits ($b_7$, $b_6$), at (0, 1), and the following 6-bit data ($b_5$ to $b_0$) is set unchanged. The video data is sampled by the 6-bit window for the following reason. Since the output from the encoding circuit 2 is 8-bit parallel data suitable for data processing, as described above, and the upper 2 bits thereof are used as the mode data, the non-compressed data can only be set in the remaining 6 bits. Therefore, the number of bits can be varied depending upon the processing mode.

On the other hand, if no variability point is present in the 6-bit window, counting of data length is continued, and the count to the next variability point is subjected to run-length encoding. This encoding operation is called a run-length mode. When a run length is 63 or less, a terminate code indicating the run length is set in the $b_5$ to $b_0$ bits, and (1, 0) for white data or (1, 1) for black data is set in the mode data of the upper 2 bits ($b_7$, $b_6$) so as to indicate the color of data. When the run length exceeds 64, the run length is expressed by a combination of a makeup code and the above-mentioned terminate code, (0, 0) being set in the upper 2 bits ($b_7$, $b_6$) as the makeup code. In addition, when a run length of 64 to 4,032 is represented by a multiple of 64, the multiple is set in the following 6 bits in binary notation. Note that black/white is not distinguished in the makeup code. The terminate code is generated prior to the makeup code.

When all the video data VD in one line is white data or black data, or when the data VD is the same color data from a point midway along a line to its end, it is expressed by a white line end signal (EWOL) or a black line end signal (BEOL) so as to correspond to the color. A page end signal (EOP) is added to the end of the video data for one page.

TABLE 1

| | | | Code Table | | | | | |
|---|---|---|---|---|---|---|---|---|
| $b_7$ | $b_6$ | $b_5$ | $b_4$ | $b_3$ | $b_2$ | $b_1$ | $b_0$ | Explanation |
| 0 | 0 | 0 | 0 | 0 | 0 | 0 | 0 | Page End (EOP) |
| 0 | 0 | 0 | 0 | 0 | 0 | 0 | 1 | Makeup 64 |
| 0 | 0 | 1 | 1 | 1 | 1 | 1 | 1 | Makeup 4032 |
| 0 | 1 | 0 | 0 | 0 | 0 | 0 | 1 | Noncompression Data (Original Data) Black = 1 |
| 0 | 1 | 1 | 1 | 1 | 1 | 1 | 0 | (Video Mode) |
| 1 | 0 | 0 | 0 | 0 | 0 | 0 | 0 | White Terminate 0 |
| 1 | 0 | 1 | 1 | 1 | 1 | 1 | 1 | 63 |
| 1 | 1 | 0 | 0 | 0 | 0 | 0 | 0 | Black Terminate 0 |
| 1 | 1 | 1 | 1 | 1 | 1 | 1 | 1 | 63 |
| 0 | 1 | 0 | 0 | 0 | 0 | 0 | 0 | White Line End (WEOL) |
| 0 | 1 | 1 | 1 | 1 | 1 | 1 | 1 | Black Line End (BEOL) |

Figure 2:
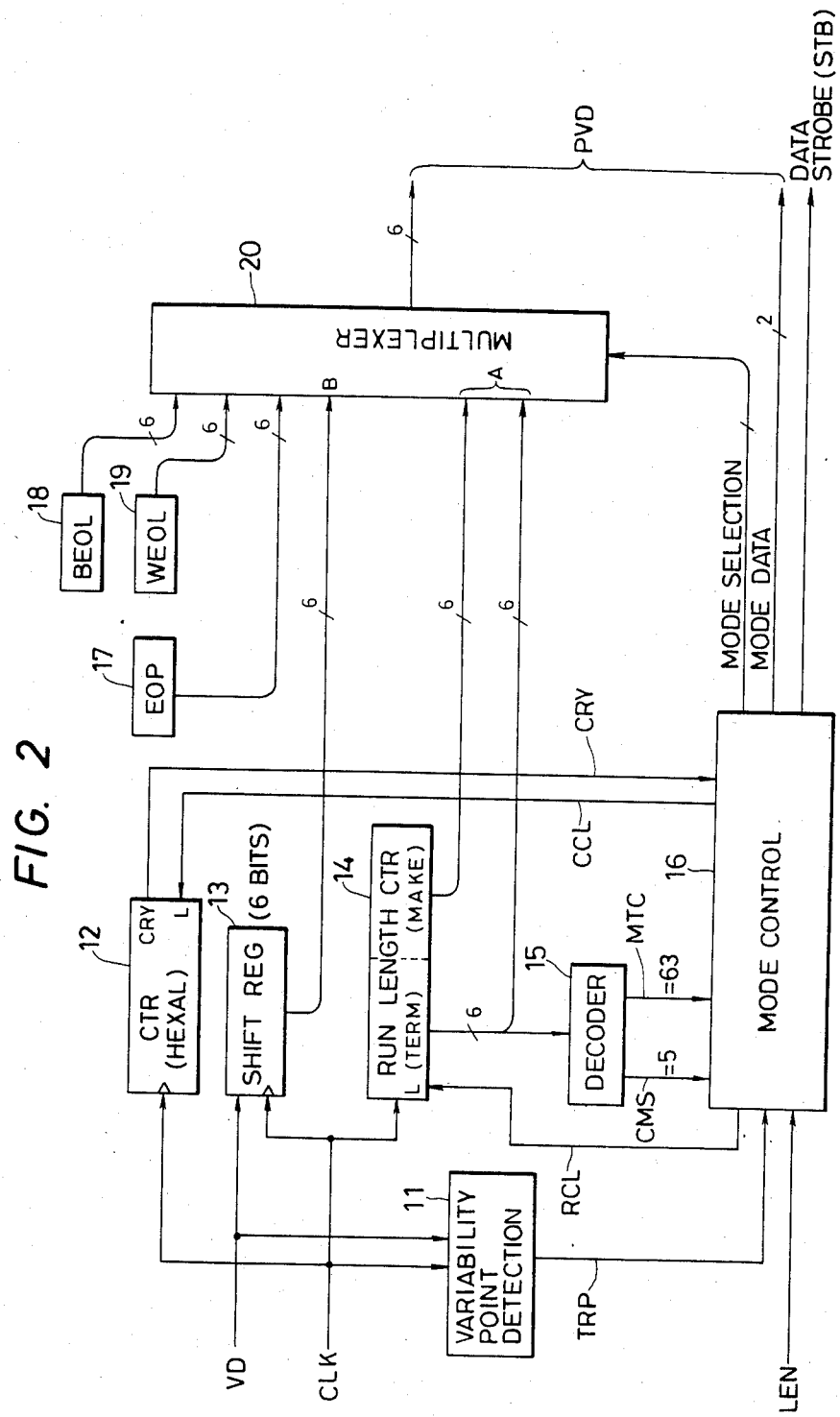
FIG. 2 is a block diagram showing a detailed arrangement of an encoding circuit.
Figure 3:
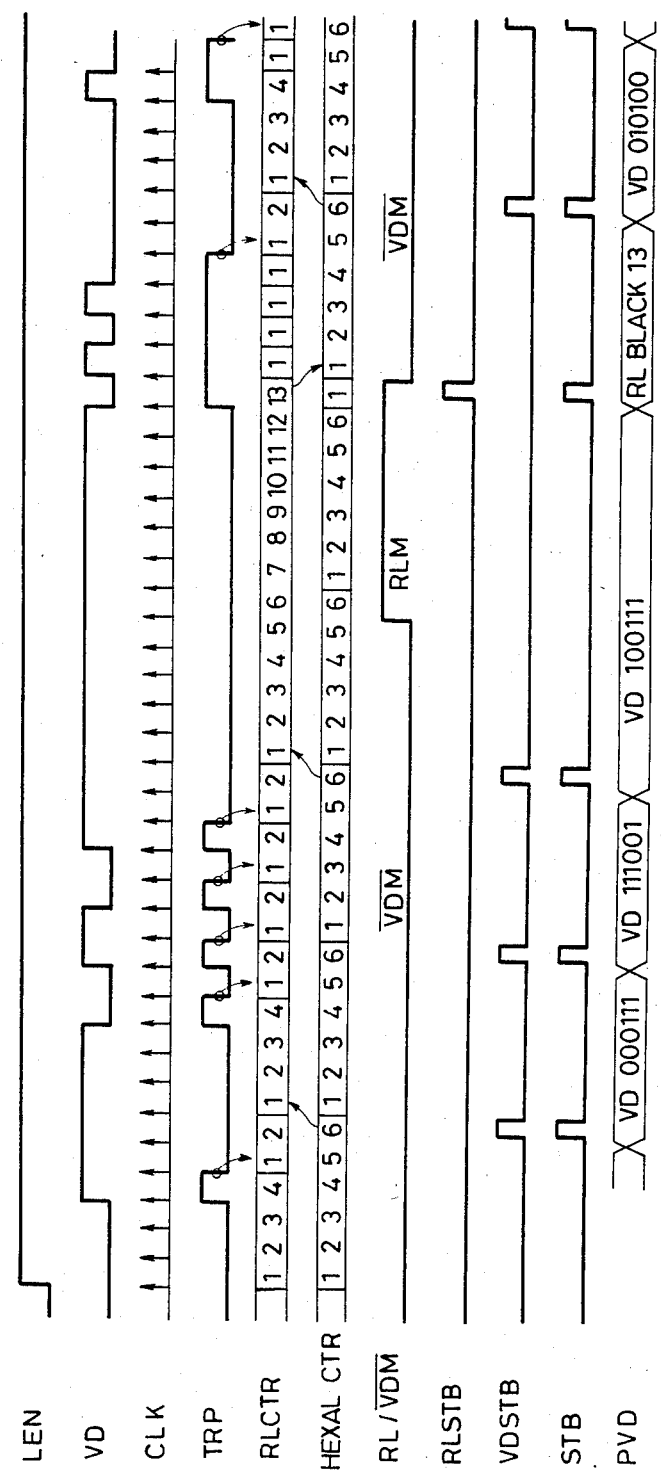
FIG. 3 is a timing chart showing the operation of the encoding circuit shown in FIG. 2.

FIG. 2 shows a detailed arrangement of the encoding circuit 2 shown in FIG. 1A. FIG. 3 is a timing chart showing the operation of the circuit shown in FIG. 2. The operation of the encoding circuit will be explained with reference to FIGS. 2 and 3.

As described above, the encoding circuit 2 selectively performs the encoding operations in the video and run-length modes in accordance with the content of input video data.

It should be noted that when input of the video data VD for one line is started, the encoding circuit 2 starts encoding in the video mode.

The video data VD from the scanner 1 is supplied to a variability point detection circuit 11 and a 6-bit shift register 13, the clock signal CLK is supplied to the circuit 11 and a hexal counter 12, and the line enable signal LEN is supplied to a mode control circuit 16.

When the variability point detection circuit 11 detects a variability point changing from white to black data or vice versa in the input video data VD, it supplies a variability point detection signal TRP to the mode control circuit 16. The mode control circuit 16 supplies a run-length clear signal to a run-length counter 14 upon reception of the variability point detection signal TRP, thereby initializing the counter 14. The counter 14 is a 12-bit counter, and starts counting the clock signal CLK from the leading edge of the line enable signal LEN. The lower 6 bits of the count of the counter 14 are used as the terminate code and the upper 6 bits thereof are used as the makeup code, and they are respectively supplied to a multiplexer 20. The lower 6 bits of the counter 14, i.e., the terminate code, are also supplied to a decoder 15 so as to be decoded thereby. When the value of the terminate code reaches 5, the decoder 15 supplies a mode change signal CMS to the mode control circuit 16, and when 63, it supplies a makeup signal MTC thereto.

As described above, when the input video data VD is changed, the run-length counter 14 clears its count. Therefore, the mode change signal CMS is supplied from the decoder 15 when video data of the same color continues for 5 bits or more. When the mode change signal CMS is supplied to the mode control circuit 16 and no variability point is present in the sixth bit, the circuit 16 determines that no variability point is present in the successive 6-bit video data VD, and switches to the run-length mode. However, when the mode change signal CMS is not supplied, the control circuit 16 determines that the video data of the same color has not continued for 5 bits or more, and performs the encoding operation in the video mode.

The hexal counter 12 starts counting the clock signal CLK from the leading edge of the line enable signal LEN. When a variability point is detected during the encoding operation in the run-length mode, the count of the counter 12 is cleared by a counter clear signal CCL from the mode control circuit 16. When a carry occurs in the hexal counter 12 in the video mode, the mode control circuit 16 clears the run-length counter 14 and supplies a video strobe signal VDSTB as a mode selection signal to a multiplexer 20 upon reception of a carry signal CRY from the counter 12.

When the video strobe signal VDSTB is generated, the 6-bit video data VD stored in the shift register 16 is fetched in parallel in the multiplexer 20. Therefore, in the video mode, when a carry occurs in the hexal counter 12, the 6-bit video data VD stored in the shift register 13 is generated through the multiplexer 20 without being changed. In this case, the mode control circuit 16 generates, 2-bit mode data indicating data is encoded in the video mode, together with the 6-bit data from the multiplexer 20, and these data, i.e., the 8-bit parallel video data PVD is stored in the buffer memory 3 in response to the data strobe signal STB from the mode control circuit 16.

After the encoding mode is switched to the run-length mode, the carry signal from the hexal counter 12 is ignored until the next variability point is detected. When the next variability point is detected, the mode control circuit 16 supplies a run-length strobe signal RLSTB as a mode selection signal to the multiplexer 20 in response to the variability point detection signal TRP from the variability point detection circuit 11.

In response to the run-length strobe signal RLSTB, the multiplexer 20 fetches in parallel the count of the run-length counter 12. Therefore, in the run-length mode, the count (terminate code, makeup code) counted by the run-length counter 12 until a variability point is detected, is generated through the multiplexer 20. In this case, the mode control circuit 16 generates 2-bit mode data indicating data is being encoded in the run-length mode. Note that when the video data exceeds a run length of 63, the mode control circuit 16 generates the run-length strobe signal RLSTB twice in response to the makeup signal MTC from the decoder 15, thereby causing the multiplexer 20 to generate data in the order of the terminate code and the makeup code. In this manner, the parallel 8-bit video data PVD combining the 6-bit data from the multiplexer 20 and the 2-bit mode data from the mode circuit 16 is stored in the buffer memory 3 in response to the data strobe signal STB from the mode control circuit 16.

In this manner, the encoding operations in the video and run-length modes are selectively carried out in one line in accordance with the variability points of the successively input video data.

When the line enable signal falls, to indicate an end of the video data for one line, the mode control circuit 16 causes the multiplexer 20 to select an output from a black data end code generator 18 or a white data end code generator 19 in accordance with the color of the last video data, thereby generating the black or white line end signal (BEOL or WEOL). When video data supply for one page is completed, the output from a page end code generator 17 is selected by the multiplexer 20, and the page end signal (EOP) is generated after the black or white line end signal, thus ending the encoding operation.

Figure 4:
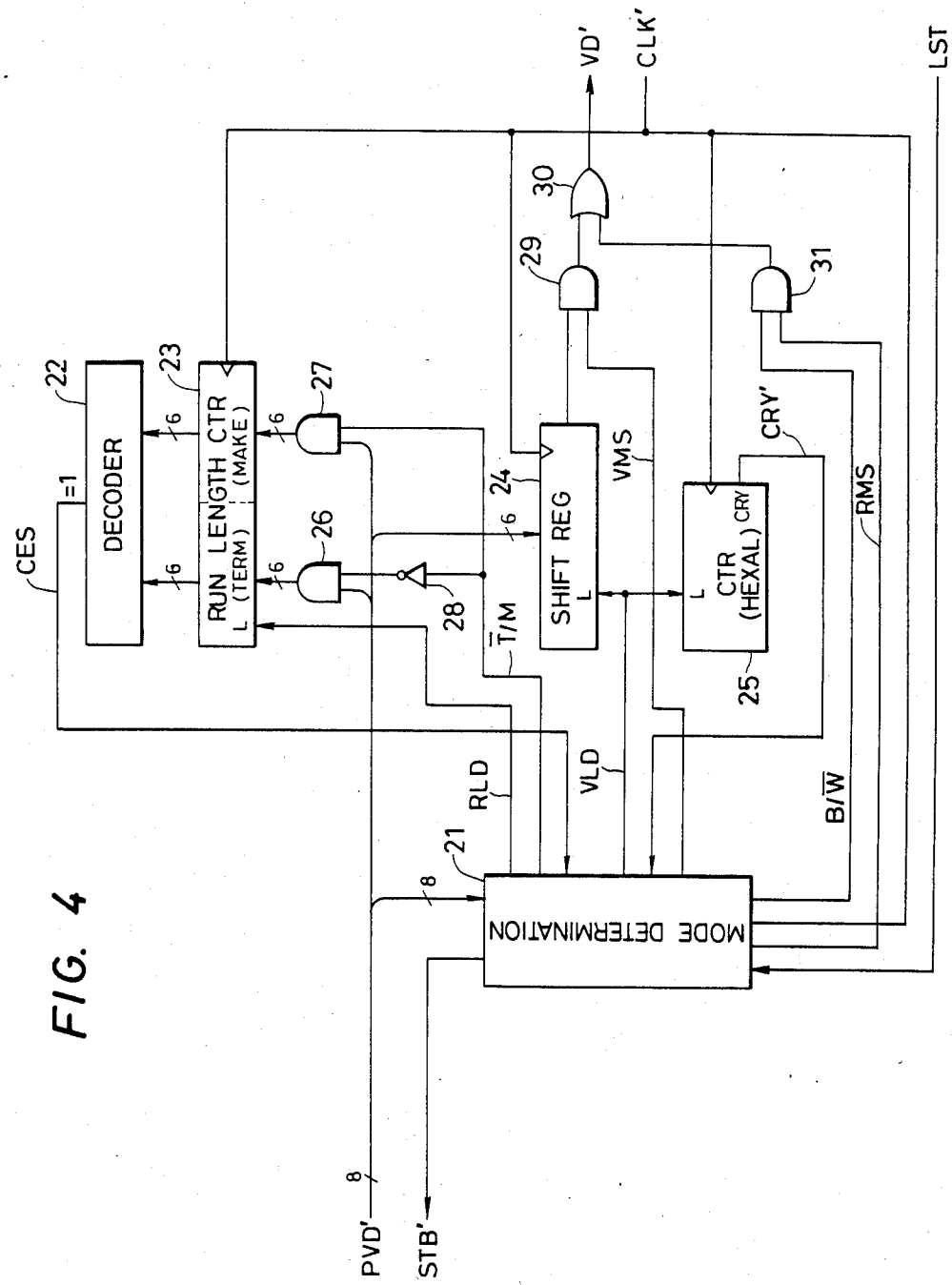
FIG. 4 is a block diagram showing a detailed arrangement of a decoding circuit.
Figure 5:
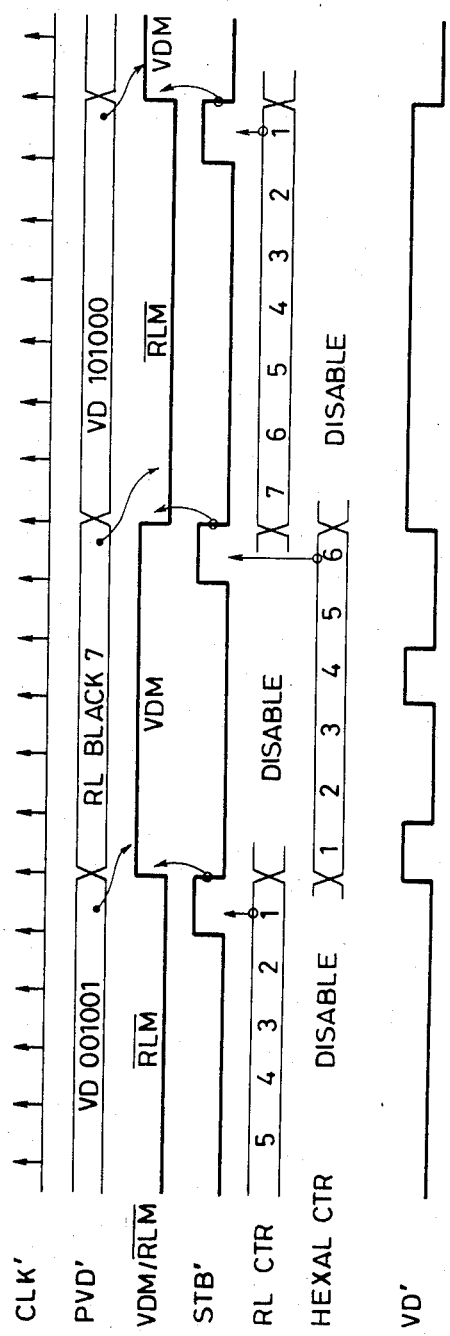
FIG. 5 is a timing chart showing the operation of the decoding circuit shown in FIG. 4.

FIG. 4 shows a detailed arrangement of the decoding circuit 7 shown in FIG. 1B for decoding the encoded video data received through through the transmission line. FIG. 5 is a timing chart showing the operation of the circuit shown in FIG. 4. The operation of the decoding circuit will be explained with reference to FIGS. 4 and 5.

The 8-bit parallel video data PVD' stored in the buffer memory 6 and including the encoded mode data is fetched in the decoding circuit 7 in response to the strobe signal STB' generated from a mode determination circuit 21 in synchronism with a line start signal LST. The 8-bit video data PVD' is divided by the circuit 21 into the mode data and the following 6-bit data.

When the input video signal PVD' is the data encoded in the video mode, the mode determination circuit 21 generates a video load signal VLD and a video mode signal VMS. In response to the video load signal VLD, a 6-bit shift register 24 fetches data other than the mode data of the input video data PVD' in parallel. A hexal counter 25 is reset by the video load signal VLD. The shift register 24 serially supplies to an AND gate 29 the fetched 6-bit data in units of bits in synchronism with the block signal CLK' from the circuit 21. In this case, since the video mode signal VMS is supplied to the other input terminal of the AND gate 29, the serial data from the shift register 24 is supplied to an OR gate 30 through the AND gate 29, and is then supplied to the printer 8 as the vodeo data VD'.

The hexal counter 25 cleared by the video load signal VLD counts the clock signal CLK' used for shifting of the video data received from the shift register 24, and supplies a carry signal CRY' to the mode determination circuit 21 upon completion of serial output of the 6-bit data from the shift register 24. The mode determination circuit 21 supplies the strobe signal STB' to the buffer memory 6 in response to the carry signal CRY', and fetches the 8-bit video data PVD'.

On the other hand, if the video data PVD' fetched from the buffer memory 6 is data encoded in the run-length mode, the mode determination circuit 21 generates a run-length load signal RLD and a run-length mode signal RMS. Furthermore, if the terminate code in the run-length mode is detected, the circuit 21 sets a makeup signal $\overline{M}/T$ at low level.

Thus, the 6-bit terminate code other than the 2-bit mode data of the input video data PVD' is loaded in a terminate unit of a run-length counter 23. At this time, the mode determination circuit 21 supplies to an AND gate 31 a color signal $B/\overline{W}$ indicating a color of an image.

A value set in the run-length counter 23 is decremented for every clock of the clock signal CLK'. The value of the run-length counter 23 is decoded by a decoder 22, and when the value is decreases to 1, the decoder 22 supplies a count end signal CES to the mode determination circuit 21. In synchronism with the count end signal CES, the circuit 21 stops generating the run-length mode signal RMS and supplies the strobe signal STB' to the buffer memory 6.

Therefore, during an output period corresponding to pixels indicated by the terminate code fetched in the run-length counter 23, the AND gate 31 generates the black or white video data, which is supplied as the video data to the printer 8 through the OR gate 30. The circuit 21 generates another strobe signal STB' so as to fetch next video data PVD'.

When the makeup code is fetched by the buffer memory 6, the mode determination circuit 21 sets the makeup signal $\overline{M}/T$ at high level, and the 6-bit makeup code, other than the 2-bit mode data of the input video data PVD', is loaded into a makeup unit of the run-length counter 23. Thereafter, as described above, the run-length counter 23 is decremented for every clock of the clock signal CLK', and when the count thereof is decreased to 1, the decoder 22 supplies the count end signal CES to the mode determination circuit 21. In this cse, the color of the previous terminate code is used as the color signal $B/\overline{W}$ of the video data.

In this manner, the transmitted video data for one line having both codes in the video and run-length modes is decoded in accordance with the corresponding encoding modes, and is supplied to the printer 8 as the successive video data VD' for one line. Note that in FIG. 4, AND gates 26 and 27 and an inverter 28 are also provided.

When the terminate code indicating data 0 is received, the mode determination circuit 21 immediately generates another strobe signal STB', and fetches the following video data PVD'. When the line end signal is received, the circuit 21 awaits completion of the decoding operation of the corresponding line, and then carries out the decoding operation for the next line upon reception of the line start signal LST from the printer 8. When the page end signal EOP is received, the circuit 21 stops the decoding operation.

Thus, a case has been described wherein the present invention is applied to the facsimile system, but the present invention can be applid to encoding/decoding operation of video data in an image file or the like. In addition to a scanner, a wordprocessor, an office computer or the like can be used as input equipment, and in addition to a printer, a display or the like can be used as output equipment.

Furthermore, the bit number of the encoded code is not limited to 8 bits, as described above, but can be increased/decreased in accordance with a system configuration. In addition, a window of the video data can have any bit number other than 6 bits.

As described above, an image having many black/white variability points such as halftone data can be encoded without increasing data amount. For example, as compared to a case wherein an MH code is used, a method of the present invention can further increase a compression ratio in the case of an image having many variability points. Since the encoding operation is basically performed by using run-length code, video data can be easily converted into a compression code such as an MH code, an MR code, an NMR code or the like of CCITT recommendations. In addition, when the obtained code is converted into the above-mentioned code, the conversion speed thereof is considerably higher than in a case wherein conversion is performed from original data, and high-speed encoding can be realized as a whole.

Input encoded video data can be optimally decoded in accordance with its content. When a compression code of CCITT recommendations such as MH, MR, MMR or the like is decoded, if the compression code is used for decoding an intermediate code, high-speed decoding operation can be achieved as compared to a case wherein the compression code is directly decoded.

Figure 6:
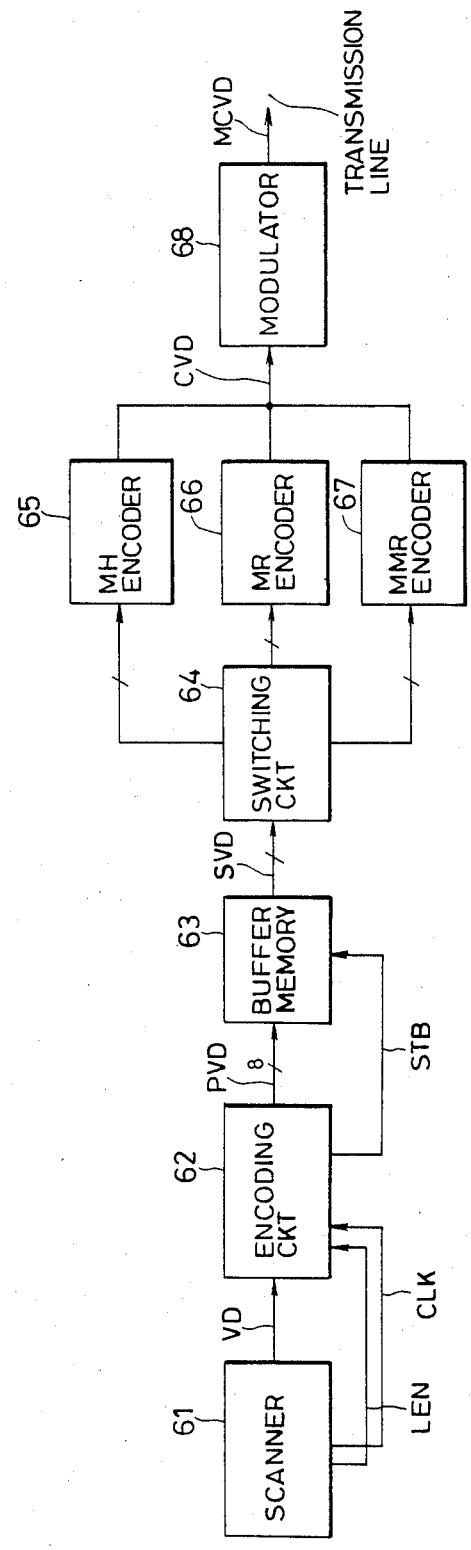
FIG. 6 is a block diagram showing an application of the arrangement shown in FIG. 1A.

FIG. 6 shows an application wherein encoders 65, 66 and 67 for MH, MR and MMR codes of CCITT recommendations are added to the video data transmission apparatus shown in FIG. 1A, and the code data PVD encoded by the encoding circuit 2 shown in FIG. 1A is used as an intermediate code.

Referring to FIG. 6, a scanner 61, an encoding circuit 62 and a modulator 68 correspond to the scanner 1, the encoding circuit 2 and the modulator 4 shown in FIG. 1A, and carry out the same operation as described above. A buffer memory 63 has a capacity for starting at least one frame of parallel 8-bit code data PVD generated from the encoding circuit 62. A switching circuit 64 selectively supplies the code data read out from the buffer memory 63 to any of the MH encoder 65, the MR encoder 66 and the MMR encoder 67. The switching circuit 64 is operable in correspondence with an encoding method with which an image scanned by the scanner 61 can be processed by the reception side apparatus, or in correspondence with characteristics of a transmission line. Video data CVD encoded by any of the MH, MR or MMR encoders 65, 66 and 67 is outputted on the transmission line as modulated data MCVD.

With the arrangement of FIG. 6, after the buffer memory 63 stores the code data PVD encoded by the encoding circuit 62 as the intermediate code for one frame, an encoding operation corresponding to characteristics of the reception side is selectively carried out so as to transmit data. Therefore, when identical data is transmitted to a plurality of apparatuses having different characteristics, the intermediate code for one frame stored in the buffer memory 63 is read out, the readout code is encoded by the MH encoder 65, and the encoded data is transmitted to a first apparatus. Then, the intermediate code stored in the buffer memory 63 is read out again, the readout code is encoded by the MR encoder 65, and the encoded data is transmitted to a second apparatus. In this manner, the identical image need not be read several times to be correspond to the number of reception apparatuses, and since the video data is stored in the buffer memory 63 as the intermediate code, a capacity of the buffer memory 63 can be decreased as compared to a case wherein original video data is stored therein.

The present invention has been described with reference to the preferred embodiment. However, the present invention is not limited to this, and various changes and modifications may be made within the spirit and scope of the appended claims.

What we claim is:

1. A video data encoding apparatus, comprising:
   means for entering binary video signals each representing color of image;
   means for discriminating whether or not binary video signals representing the same color of image continue in excess of a predetermined number of signals;
   first generating means for generating code data, in the event that said discriminating means discriminates continuous binary video signals representing the same color of image in excess of the predetermined number of signals, said code data indicating the number of binary video signals entered until the color of image represented by the binary video signals changes, and the color of image represented by the continuous binary video signals; and
   second generating means for generating the binary video signals, as code data, in the vent that said discriminating means discriminates binary video signals representing the same color of image, not exceeding the predetermined number of signals.

2. An apparatus according to claim 1, wherein said first generating means includes means for counting the number of the continuous binary video signals representing the same color of image, and generates the code data based on the counting value of said counting means.

3. An apparatus according to claim 1, wherein said second generating means includes holding means for sequentially taking in the entered binary video signals and holding the predetermined number of binary video signals, and generates the binary video signals held by said holding means, as code data.

4. An apparatus according to claim 1, further comprising means for selecting either one of the code data generated from said first generating means or the code data generated from said second generating means in accordance with the discrimination result of said discriminating means.

5. An apparatus according to claim 1, wherein each of binary video signals represents a white or a black image.

6. An apparatus according to claim 1, further comprising means for adding data indicating the content of code data to each of the code data generated from said first and second generating means.

7. An apparatus according to claim 1, wherein said entering means is adapted to enter the binary video signals obtained by scanning an original image.

8. An apparatus according to claim 1, wherein said discriminating means includes means for detecting variation of the color of image represented by the binary video signal entered from said entering means.

9. A video data encoding apparatus, comprising:
   means for entering binary video signals each representing color of image;
   means for detecting a variation point of color of image represented by the entered binary video signals;
   first generating means for generating code data, in the event that said detecting means has not detected a variation point of color of image in the occurrence of a predetermined number of binary video signals, said code data indicating the number of binary video signals entered until a variation point of color of image is detected by said detecting means, and the color of image represented by the associated binary video signals; and
   second generating means for generating the binary video signals, as code data, in the event that said detecting means detects a variation point of color of image in occurrence of the predetermined number of binary video signals.

10. An apparatus according to claim 9, wherein said first generating means includes means for counting the number of binary video signals, and generates the code data based on the counting value of said counting means.

11. An apparatus according to claim 9, wherein said second generating means includes holding means for sequentially taking in the entered binary video signals and holding the predetermined number of binary video signals, and generates the binary video signals held by said holding means, as code data.

12. An apparatus according to claim 9, wherein each of said binary video signals represents a white or a black image.

13. An apparatus according to claim 9, further comprising means for adding data indicating the content of code data to each of the code data generated from said first and second generating means.

14. An apparatus according to claim 9, wherein said entering means is adapted to enter the binary video signals obtained by scanning an original image.

* * * * *